United States Patent [19]

Takeuchi et al.

[11] Patent Number: 5,009,833
[45] Date of Patent: Apr. 23, 1991

[54] EXPERT SYSTEM FOR SURVEILLANCE, DIAGNOSIS AND PROGNOSIS OF PLANT OPERATION

[75] Inventors: Kenji Takeuchi, Murrysville; Andre F. Gagnon, Monroeville; Augustine C. Cheung, Murrysville; Philip E. Meyer, Penn Hills, all of Pa.

[73] Assignee: Westinghouse Electric Corp., Pittsburgh, Pa.

[21] Appl. No.: 295,698

[22] Filed: Jan. 11, 1989

[51] Int. Cl.$^5$ ............................................. G21C 7/36
[52] U.S. Cl. ................................. 376/217; 376/216; 364/274.5; 364/924.4
[58] Field of Search ............... 376/215, 216, 217; 364/138 X, 492, 188, 189, 431.01, 513, 556, 578, 274.5, 917.94

[56] References Cited

U.S. PATENT DOCUMENTS

| | | | |
|---|---|---|---|
| 4,770,843 | 9/1988 | Taleyarkhan | 376/216 |
| 4,803,040 | 2/1989 | Gross | 376/216 |
| 4,853,175 | 8/1989 | Book | 376/216 |

OTHER PUBLICATIONS

Hassberger et al., Nuc. Sci & Eng: 102, 153-171 (1989), received 6/21/88, accepted 12/19/88.
Cheung et al., "The Westinghouse Transient Real-Time Engineering Analysis Tool", presented at Specialists Meeting on Small Break Loca Analyses in LWRS, Pisa, Italy, Jun. 23-27, 1985.
PCTRAN Newsletter, Micro-Simulation Technology, vol. 6, Aug. 1988.

Primary Examiner—Donald P. Walsh

[57] ABSTRACT

An expert system is used to perform surveillance, diagnosis and prognosis of a plant such as a nuclear reactor used in electrical power generation. The expert system uses one of current actual plant data, previously stored actual plant data or simulated plant data as plant condition data to perform an evaluation of operating conditions in the plant. When current actual plant data is used, a data acquisition system supplies the plant condition data. The expert system accesses the plant condition data, regardless of its source, periodically as a surveillance frame is triggered by the rules in the root frame controlling the expert system. Other frames in the expert system perform diagnosis and prognosis of the plant condition.

14 Claims, 2 Drawing Sheets

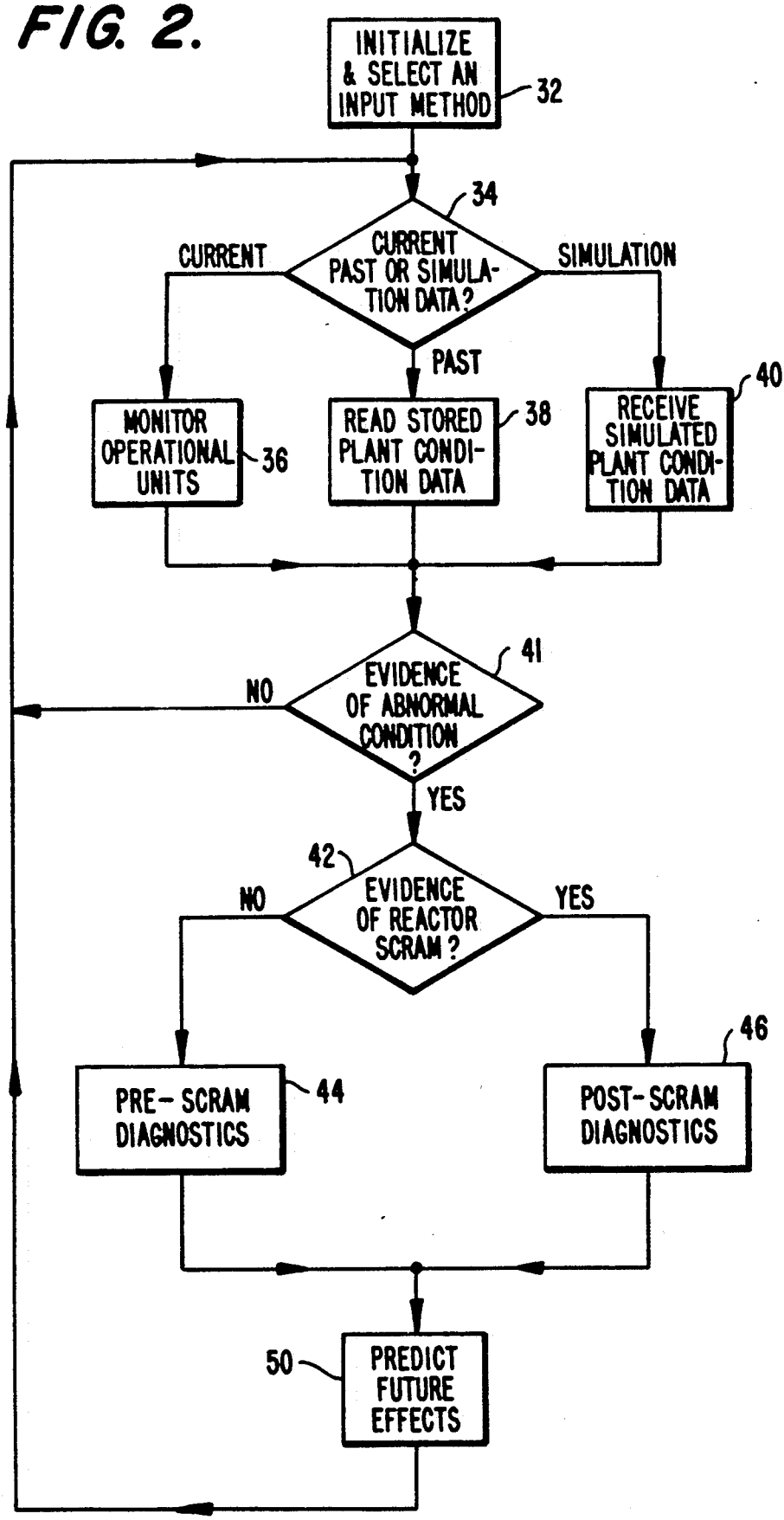

EXPERT SYSTEM FOR SURVEILLANCE, DIAGNOSIS AND PROGNOSIS OF PLANT OPERATION

BACKGROUND OF THE INVENTION

1. Field of the Invention

The present invention is related to a system for analyzing operating conditions in a plant and, more particularly, use of an expert system rule base to perform surveillance, diagnosis and prognosis of a nuclear power plant.

2. Description of the Related Art

Nuclear power plants, like other electricity generating plants, chemical processing plants and other complex manufacturing facilities, typically have numerous sensors and controls used in monitoring and controlling the operation of the plant. Conventionally, an operator monitors gauges or other displays indicating the status of various operating conditions in the plant to determine appropriate modifications to how the plant is controlled. The appropriateness of a response to a change in the large number of interrelated plant data varies significantly with the experience of the operator.

Efforts to improve the ability of operators to respond appropriately to changes in plant data include simulation programs and other forms of conventional training. Examples of simulation programs include PCTRAN from Micro-Simulation Technology of Boonton, N.J. and Westinghouse Transient Real-time Interactive Engineering Analysis Tools (TREAT and TOMCAT). However, there is no existing way to provide an expert's response whenever changes occur in plant data.

SUMMARY OF THE INVENTION

An object of the present invention is to provide an operator with an expert's analysis of plant condition data.

Another object of the present invention is to provide an expert system rule base for dynamically diagnosing plant condition data to aid in the operation of a complex industrial plant, such as a nuclear reactor.

Yet another object of the present invention is to apply an expert system rule base to predict the likelihood of future events based upon current plant condition data.

A further object of the present invention is to provide an aid for training plant operators by analyzing previously stored plant data or simulated plant data using an expert system rule base.

The above objects are attained by providing a method for analyzing operating conditions in a plant, comprising the steps of: obtaining plant condition data indicative of the operating conditions in the plant; evaluating the plant condition data using an expert system rule base to determine probabilities of existence of abnormal circumstances; and predicting effects of the abnormal circumstances in dependence upon the plant condition data. The plant condition data may be obtained by one of the following methods: monitoring operational units in the plant to obtain current actual plant data, inputting previously recorded actual plant data or receiving simulated plant data. The dynamic expert system rule base is preferably designed to periodically update the plant condition data when the first of these three methods are used to obtain the plant condition data.

The evaluation performed by the expert system is preferably separated into three functions: determining whether the plant condition data indicates that an operation effecting event has occurred; evaluating the plant condition data for the abnormal circumstances unlikely to cause the operation effecting event within a predetermined amount of time; and evaluating the plant condition data for the abnormal circumstances capable of causing the operation effecting event after the operation effecting event is detected.

These objects, together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIG. 2 is a flow chart of a method according to the present invention.

DESCRIPTION OF THE PREFERRED EMBODIMENT

Figure 1:
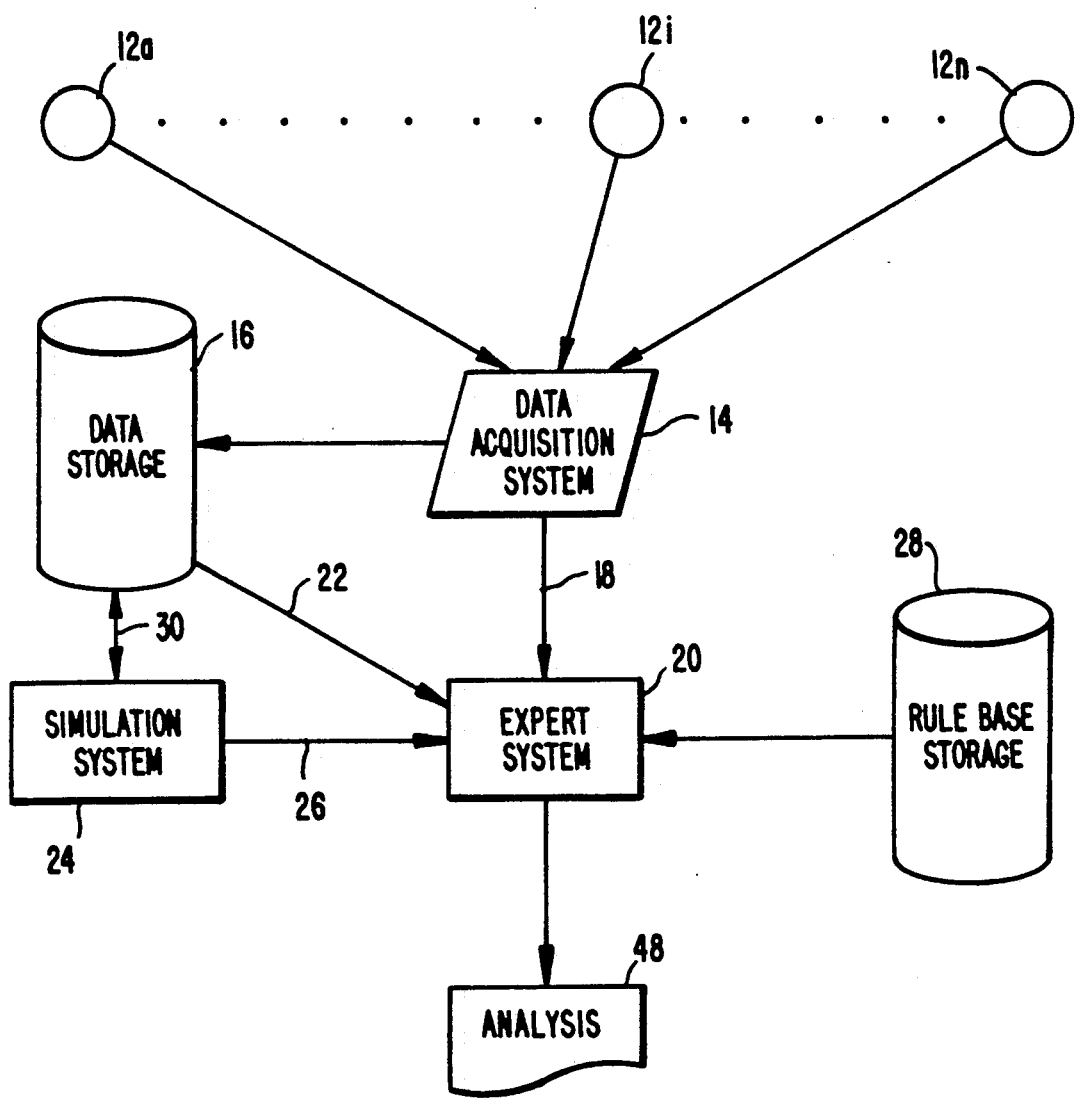
FIG. 1 is a block diagram of a system according to the present invention.

The present invention can be applied to evaluation of plant condition data from many different types of plants, including electrical power generating plants, petrochemical processing plants, pharmaceutical plants, and many others. The embodiment illustrated in FIG. 1 is generic, but will be described with reference to the specific application of the present invention to a nuclear reactor used for electrical power generation. In such an application, the plant operation data may include pressurizer pressure and water level, reactor cooling system (RCS) pressure, water level in a volume control tank, charging flow rate, containment radiation level, etc. This data is obtained from what will be termed operational units $12a$–$12n$ with a representative operational unit indicated by $12i$ in FIG. 1. In the case of a nuclear reactor, the operational units include the pressurizer, the volume control tank, the RCS, etc. As indicated by the examples of plant condition data, more than one item of plant data may be produced by a single operational unit.

The actual plant data generated by sensors mounted in, on or near the operational units $12a$–$12n$ is monitored by a data acquisition system 14. The data acquisition system may be any conventional system for acquiring data from a plurality of sensors distributed throughout a plant or a single piece of equipment for which operation data is to be evaluated. Many data acquisition systems are commercially available, including one requiring a minimal number of transmission wires which is described in U.S. patent application Ser. No. 934,238, filed Nov. 20, 1987. The actual plant data obtained by the data acquisition system 14 may be stored in data storage 16 or supplied via acquisition interface 18 to an expert system 20 described below in more detail. Previously recorded actual plant data can be supplied from the data storage 16 to the expert system via a storage interface 22. An alternative method of obtaining plant condition data for evaluation by the expert system 20 is to use simulated plant data generated by a simulation system 24 such as TREAT or TOMCAT. The simulated plant data is supplied to the expert system 20 via a simulation interface 26.

Numerous forms of expert or knowledge systems, using "artificial intelligence" are known and commercially available for use in the expert system 20. Preferably, the expert system 20 is a commercial expert system shell, such as PERSONAL CONSULTANT PLUS from Texas Instruments, using rules stored in rule base storage 28. However, other expert system shells or a custom built expert system can be used instead.

Depending upon the amount of data which is evaluated and the capacity of equipment used, the data storage 16 and rule base storage 28 may be the same physical storage and may be included in a single data processing system which includes software and hardware for performing the functions of the data acquisition system 14, expert system 20 and simulation system 24. A larger scale system, such as that used to monitor tens or hundreds of operational units in a nuclear reactor is likely to use a stand-alone data acquisition system 14 with a conventional acquisition interface 18 to a minicomputer or microcomputer. The minicomputer or microcomputer will likely be used to run software for both the simulation system and the expert system, but if an existing simulation system 24 is run on a data processing system which does not have the capacity to simultaneously run the expert system 20, a separate computer may be used to run the expert system 20 or the data output by the simulation system may be stored in data storage 16, as indicated by dashed line 30 so that the expert system 20 can be subsequently, or in a timesharing manner, run on the same computer as the simulation system 24. Whether implemented solely in software between separate software units running on a single computer or also including separate hardware units, the acquisition interface 18, storage interface 22 and simulation interface 26 provide data input means for obtaining plant condition data indicative of the operating conditions in the plant to be evaluated by the expert system 20.

A method according to the present invention is illustrated in the form of a flowchart in FIG. 2. Execution of the method begins with initialization 32 including selecting an input method. In the preferred embodiment, the expert system 20 can be used to evaluate past or current actual plant data or simulated plant data. If the invention is to be used solely for evaluating one or two of these types of data, the selection 32 of input method would be modified, or eliminated.

Initialization 32 of the expert system 20 includes reading in parameters for, e.g., nominal values, technical specification values and threshold values based upon the design of the plant and experience in operating the plant. In addition, parameters are defined which will be set true only once during execution of the expert system 20. In the case of a nuclear reactor, these parameters indicate existence of conditions requiring a response and subsequent performance of the response, such as discovery time of plant abnormal condition, automatic reactor scram, manual reactor scram, safety injection activation, etc. By defining these parameters in the root frame and using antecedent rules (forward chaining logic) to record finding major conditions, existence of these conditions are determined only once.

In the preferred embodiment, after initialization has been completed and an input method selected, one of three input methods is used depending 34 upon the input method selected during initialization 32. If current actual plant data is to be evaluated, operational units 12a-12n are monitored 36 to obtain plant condition data indicative of the operating conditions in the plant. Similarly, if previously recorded actual plant data is selected 32 to be input as the plant condition data, the plant data stored in data storage 16 is read 38 via interface 22. On the other hand, if simulated plant data has been selected to be input as the plant condition data, the simulated plant data is received 40 via interface 26 from the simulation system 24.

A child frame, which will be called SURVEILLANCE, of the root frame, which will be called REACTOR-STATUS is executed to evaluate the plant condition data. Execution of the SURVEILLANCE frame is triggered by a rule in the root frame stating action to be taken if a previously undefined parameter (RX-STAT) indicates that an abnormal condition exists. This rule, like most of the rules in the preferred embodiment uses backward chaining logic. The expert system shell will search for rules which determine a value for the parameter RXSTAT. It will be assumed that this parameter is defined in the SURVEILLANCE frame, but requires the evaluation of several other rules first. Included in the other rules are user-defined functions which execute programs external to the expert system shell to read in data via the selected one of the interfaces 18, 22 or 26. For example, below is a rule in PERSONAL CONSULTANT PLUS syntax which accesses a file of previously recorded actual (or simulated) plant data.

RULE (1)

SUBJECT:: SURVEILLANCE-RULES
IF:: (INPUT-CODE-EXE AND SURV-FILE IS KNOWN)
THEN:: (DOS-CALL C:PROFINPUT.EXE AND O-FILE=SURV-FILE)

The precise form of the rules depends upon the type of plant data being monitored. Regardless of the type of plant, a first determination 41 is whether there is evidence of an abnormal condition. If there is no such evidence, a new set of data is read. If there is evidence of an abnormal condition, a second determination 42 is made to determine its seriousness. In the case of a nuclear reactor, critical operation effecting events include a reactor scram in which the reactor is partially or completely shut down, and accidents which do not cause a reactor scram. Other types of plants may have other critical operation effecting events with some plants having more than one type of operation effecting event.

In the preferred embodiment's application to a nuclear reactor, a determination is made 42 as to whether there is evidence of a reactor scram which is an operation effecting event. Another child frame of the REACTOR-STATUS root frame may be used to collect rules for performing diagnostics. In the preferred embodiment, such a frame will be called DIAGNOSTICS. Either SURVEILLANCE or DIAGNOSTICS or both frames may include the determination 42 of evidence of a reactor scram.

In addition, the DIAGNOSTICS frame may have several child frames of its own which perform different types of diagnostics. Examples of some types of diagnostics include pre-scram diagnostics 44 and postscram diagnostics 46. Other possible stages of transient conditions in the reactor, such as the period between generation of a scram signal and completion of the scram, anticipated trips without scram (ATWS) and a manual scram perform before ATWS, may be included the pre-scram diagnostics or in separate frames.

The diagnostic rules for an expert system used to evaluate plant condition data from a nuclear reactor plant should be designed to detect known types of abnormal circumstances. In the case of pre-scram diagnostics 44, accidents with a relatively long period of time between discovery of abnormality and reactor scram and even smaller accidents not requiring reactor scram should be included in the rules. Examples of circumstances which may be detected in the pre-scram diagnostics 44 include an unnecessary reactor scram, unnecessary safety injection activation, a small break loss of coolant accident, a steam generator tube rupture, feedline breaks and leaks. In the case of loss of coolant accidents and steam generator tube ruptures, an estimate of the break size should be made. Rule (2) is an example of a rule in PERSONAL CONSULTANT PLUS syntax of detection of a condition which may indicate a steam generator tube rupture.

RULE (2)

SUBJECT :: PRSCRAM-SGTR-RULES
IF:: (D-PRZR-DLDT<TH-PRZR-DLDT)
THEN:: (PRZR-LEV-DEC)

In rule (2), the parameter D-PRZR-DLDT indicates change in level in the pressurizer, TH-PRZR-DLDT indicates a threshold for level change in the pressurizer and PRZR-LEV-DEC indicates that the pressurizer level is decreasing. Thus, small fluctuations in the pressurizer level remain undetected, but if a significant change in level is detected, the parameter PRZR-LEV-DEC is set to TRUE to indicate that the pressurizer level is decreasing. One possible cause of a decrease in the pressurizer level is a steam generator tube rupture. In other rules, the parameter PRZR-LEV-DEC can be combined with other indications of plant conditions to determine whether the drop in pressurizer level was caused by a steam generator tube rupture.

The post-scram diagnostics 46 are typically determined by guidelines required by the Nuclear Regulatory Commission (NRC). Emergency Response Guidelines (ERG) typically determine not only what types of abnormal conditions need to be considered in determining the cause of a reactor scram, but even the order of checking for the circumstances. The results of the pre-scram 44 or post-scram 46 diagnostics, together with any other diagnostics which are performed, are provided as part of the analysis 48 output by the expert system 20. In FIG. 1, analysis 48 is indicated as being provided in report form. However, the information can also be displayed on an operator's screen or recorded for later human evaluation.

In the preferred embodiment of the present invention, the expert system 20 (FIG. 1) in addition to diagnosing the likely cause of plant conditions, also predicts 50 future effects of the abnormal circumstances diagnosed using the plant condition data. The prediction of future effects can be applied to either pre-scram 44 or post-scram 46 diagnostic results. The rules may all be written in the expert system shell's syntax, e.g., the syntax used by PERSONAL CONSULTANT PLUS, or as, e.g., FORTRAN programs accessed by rules in the expert system 20 in a manner similar to the access of plant condition data by rule (1).

After all possible inferences have been drawn from one set of plant condition data, as indicated in FIG. 2 the expert system 20 automatically loops back to access another set of plant condition data. This can be performed automatically by using local parameters of the child frames which "belong" to the root frame REACTOR-STATUS. Thus, where a rule like rule (3) below is included in the root frame and RX-STAT is defined in the SURVEILLANCE frame, the SURVEILLANCE frame will be repeatedly executed until RX-STAT has a value of DIAGNOSE.

RULE (3)

SUBJECT:: RX-STATUS-RULES
IF:: (RX-STAT =DIAGNOSE)
THEN:: (SURVEILLANCE-RESULTS=DIAGNOSE AND PRINT "Reactor Operation Status is found to be ABNORMAL.")

In expert system shells which do not operate in this manner, or as an alternative way of causing repeated execution of an external program which reads in one record at a time, the following rule (4) can be included:

| RULE (4) |
| --- |
| SUBJECT :: ACCESS PLANT DATA |
| IF :: (RX-MODE IS NORMAL AUTO-RX-SCRAM-CONDITION DOES NOT EXIST, |
| . |
| . |
| LEAK DOES NOT EXIST, AND PRESSURE DROP RATE IS NORMAL) |
| THEN :: (DOS-CALL C:/PROF/INPUT.EXE EVERY ACCESS-PERIOD) | where ACCESS-PERIOD is e.g., two minutes.

Although FIG. 2 indicates that diagnostics 44, 46 and predictions 50 are performed each time, an initial test may be made as to whether any of the plant conditions are outside of normal range and only if so, will diagnostics 44, 46 and predictions 50 be performed. For example, rule (5) can be used where the SURVEILLANCE frame provides an indication of whether the frame DIAGNOSTICS should be performed.

RULE (5)

SUBJECT :: RX-STATUS-RULES
IF:: (SURVEILLANCE-RESULT=DIAGNOSE AND DIAG-RESULT IS KNOWN)
THEN:: (PRINT "The result of diagnostics is:" DIAG-RESULT)

Similarly, the predictions 50 may be performed only if certain abnormal circumstances are diagnosed.

While the reading 38 of previously stored actual plant data requires a simple interface between a disk file and the expert system 20, in order to obtain current actual plant data, the data acquisition system 14 must monitor the operational units 12a–12n concurrently with the evaluation performed by the expert system 20. In the preferred embodiment, the expert system 20 executes a program in the manner illustrated above in rules (1) and (4) to obtain the most recently acquired data from the data acquisition system 14 via interface 18 to update the plant condition data. Alternatively, any of the input steps 36, 38, 40 can use prompts to have an operator manually input data which may be read 36 from gauges or read from written or printed prior 38 or simulated 40 plant data.

The many features and advantages of the present invention are apparent from the detailed specification and thus, it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to falling within the scope and spirit of the invention.

What is claimed is:

1. A method for analyzing operating conditions in a plant, comprising the steps of:
   (a) obtaining plant condition data indicative of the operating conditions in the plant;
   (b) evaluating the plant condition data using an expert system rule base to determine probabilities of existence of abnormal circumstances;
   (c) predicting effects of the abnormal circumstances in dependence upon the plant condition 2. A method as recited in claim 1, wherein step (a) comprises at least one of:
   (a1) monitoring operational units in the plant to obtain current actual plant data as the plant condition data concurrently with execution of step (b);
   (a2) inputting previously recorded actual plant data as the plant condition data; and
   (a3) receiving simulated plant data as the plant condition data.

3. A method as recited in claim 2, further comprising the steps of:
   (d) providing, as alternatives for said obtaining, said monitoring of step (a1), said inputting of step (a2) and said receiving of step (a3); and
   (e) selecting one of said monitoring of step (a1), said inputting of step (a2) and said receiving of step (a3) to obtain the plant condition data.

4. A method as recited in claim 3, wherein said evaluating in step (b) includes the step of periodically updating the plant condition data using the current actual plant data obtained by said monitoring in step (a).

5. A method as recited in claim 2, wherein step (b) comprises:
   (b1) chaining rules backward to determine possible causes of the operating conditions; and
   (b2) determining probable occurrence of events using forward chaining logic.

6. A method as recited in claim 2, wherein step (b) comprises:
   (b1) determining whether the plant condition data indicates that an operation effecting event has occurred;
   (b2) evaluating the plant condition data for the abnormal circumstances unlikely to cause the operation effecting event within a predetermined amount of time; and
   (b3) evaluating the plant condition data for the abnormal circumstances capable of causing the operation effecting event after the operation effecting event is detected in step (b1).

7. A method as recited in claim 6, wherein the plant is a nuclear reactor,
   wherein the operation effecting event includes a reactor scram and accidents occurring without causing a reactor scram, and
   wherein step (b) further includes the step of (b4) determining existence of other abnormal circumstances undetected in step (b1).

8. A method of analyzing operating conditions in a plant, comprising the steps of:
   (a) providing alternative methods for obtaining plant condition data indicative of the operating conditions in the plant, the alternative methods including
   (a1) monitoring operational units in the plant to obtain current actual plant data as the plant condition data;
   (a2) inputting previously recorded actual plant data as the plant condition data; and
   (a3) receiving simulated plant data as the plant condition data;
   (b) selecting one of said monitoring of step (a1), said inputting of step (a2) and said receiving of step (a3) to obtain the plant condition data; and
   (c) evaluating the plant condition data, concurrently with said monitoring in step (a1), using an expert system rule base to determine probabilities of existence of abnormal circumstances.

9. A method as recited in claim 8, wherein step (c) comprises:
   (c1) chaining rules backward to determine possible causes of the operating conditions; and
   (c2) determining probable occurrences of events using forward chaining logic.

10. A method as recited in claim 8, wherein step (c) comprises:
    (c1) determining whether the plant condition data indicates that an operation effecting event has occurred;
    (c2) evaluating the plant condition data for the abnormal circumstances unlikely to cause the operation effecting event within a predetermined amount of time; and
    (c3) evaluating the plant condition data for the abnormal circumstances capable of causing the operation effecting event after the operation effecting event is detected in step (b1).

11. A method as recited in claim 10, wherein the plant is a nuclear reactor,
    wherein the operation effecting event includes a reactor scram and accidents occurring without causing a reactor scram, and
    wherein step (b) further includes the step of (b4) determining existence of other abnormal circumstances undetected in step (b1).

12. An apparatus for analyzing operating conditions in a plant, comprising:
    data input means for obtaining plant condition data indicative of the operating conditions in the plant by continuously monitoring operational units in the plant to obtain current actual plant data as the plant condition data;
    storage means for storing an expert system rule base; and
    evaluation means for evaluating, concurrently with the monitoring performed by said data input means, the plant condition data using the expert system rule base to determine probabilities of existence of abnormal conditions.

13. An apparatus as recited in claim 12, wherein said evaluation means is controlled by the expert system rule base to periodically update the plant condition data using the current actual plant data obtained by said monitoring means.

14. An apparatus as recited in claim 13, further comprising:
    prior data means for storing previously recorded actual plant data; and
    simulation means for supplying simulated plant data, and
    wherein said data input means comprises means for obtaining the plant condition data from one of the current actual plant data, the previously recorded actual plant data and the simulated plant data under control of said evaluation means.

* * * * *